US011282250B2

(12) United States Patent
Taylor et al.

(10) Patent No.: US 11,282,250 B2
(45) Date of Patent: Mar. 22, 2022

(54) ENVIRONMENTAL BASED DYNAMIC CONTENT VARIATION

(71) Applicant: DISNEY ENTERPRISES, INC., Burbank, CA (US)

(72) Inventors: Alice J. Taylor, Burbank, CA (US); Steven M. Chapman, Newbury Park, CA (US); Alexandra J. Lewis Christiansen, Valley Glen, CA (US); Jackson Rogow, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/836,258

(22) Filed: Mar. 31, 2020

(65) Prior Publication Data

US 2021/0304470 A1   Sep. 30, 2021

(51) Int. Cl.
*G06T 11/60* (2006.01)

(52) U.S. Cl.
CPC ................................. *G06T 11/60* (2013.01)

(58) Field of Classification Search
None
See application file for complete search history.

(56) References Cited

U.S. PATENT DOCUMENTS 7,716,248 B2    5/2010   Kadambi et al.
7,853,617 B2   12/2010   Kadambi et al.

OTHER PUBLICATIONS

Ana Tudor, "Methods for Contrasting Text Against Backgrounds", https://css-tricks.com/methods-contrasting-text-backgrounds/, 2017. (Year: 2017).*
Wu et al., "Dynamic Correction of Color Appearance on Mobile Displays", Graphics Interface, 2008. (Year: 2008).*

* cited by examiner

*Primary Examiner* — Nicholas R Wilson
(74) *Attorney, Agent, or Firm* — Dorsey & Whitney LLP

(57) ABSTRACT

The present disclosure describes systems and methods directed to updating pre-generated content by applying secondary effects associated with detected and/or collected environmental data corresponding to a display environment. In operation, a sensor device detects environmental data corresponding to a display environment. A computing device may identify a secondary effect corresponding to the detected environmental data. The secondary effect may be applied to pre-generated content to update the content, and the updated pre-generated content may be displayed on a display. Accordingly, systems and methods described herein enable an improved immersive viewing experience by incorporating features of a user's environment into pre-generated content.

22 Claims, 4 Drawing Sheets

ENVIRONMENTAL BASED DYNAMIC CONTENT VARIATION

FIELD

Examples described herein generally relate to an immersive content viewing experience and real-time pre-generated content modification based on collected environmental data.

BACKGROUND

Pre-generated content, such as movies, television shows, videos, and the like, can be presented from various sources (e.g., streamed from one or more servers, retrieved from local memory, read from a storage device, etc.). Other than interactive content, such as video games, most pre-generated content consumed by users is not interactive and is static with respect to a user's (e.g., viewer's) environment or a user's actions. While interactive content, such as video games, may include some interaction with a user, such content requires an active input from a user and cannot adapt to a user's environment. In these instances, a user cannot fully become immersed in the content or feel as though the content is engaging and realistic.

SUMMARY

Embodiments of the present invention relate to methods and systems for updating (e.g., modifying, altering, etc.) pre-generated content based on (e.g., corresponding to) detected and/or collected environmental data corresponding to a display environment. In operation, a sensor device detects environmental data corresponding to a display environment. In some examples, the detected environmental data includes at least one of brightness data, light data, color data, contrast data, depth data, proximity data, tone data, edge data, or directionality data.

A processor, communicatively coupled to the sensor device, identifies, based at least in part of the detected environmental data, a secondary effect of a plurality of secondary effects corresponding to the detected environmental data to apply to pre-generated content. In some examples, secondary effects may include but are not limited to light variation filters and/or color filters.

In some examples, identifying a secondary effect includes transforming the detected environmental data into a plurality of vectors, comparing, using a matching algorithm, the plurality of vectors to secondary effect. In some cases, the matching algorithm includes at least one of a brightness matching function, a light matching function, a color matching function, a contrast matching function, a depth matching function, a proximity matching function, a tone matching function, an edge matching function, or a directionality matching function. Based at least in part on a vector of the plurality of vectors meeting or exceeding a similarity threshold associated with a particular secondary effect of the plurality of secondary effects, the particular secondary effect is identified as the secondary effect to apply to the pre-generated content.

In other examples, identifying a secondary effect includes identifying a secondary effect includes, transforming the detected environmental data into a plurality of vectors, and comparing, using a matching algorithm, the plurality of vectors with the effect place holder. In some cases, the matching algorithm includes at least one of a brightness matching function, a light matching function, a color matching function, a contrast matching function, a depth matching function, a proximity matching function, a tone matching function, an edge matching function, or a directionality matching function. Based at least in part on a particular vector of the plurality of vectors meeting or exceeding a similarity threshold associated with the effect place holder, the detected environmental data associated with the particular vector is identified as the secondary effect to apply to the pre-generated content at the effect place holder.

The processor applies the identified secondary effect to the pre-generated content prior to the pre-generated content being displayed on a display. The display, communicatively coupled to the processor, displays the pre-generated contenting, including the identified secondary effect.

In addition to the exemplary aspects and embodiments described above, further aspects and embodiments will become apparent by reference to the drawings and by study of the following description.

BRIEF DESCRIPTION OF THE DRAWINGS

Reference is now made to the following descriptions taken in conjunction with the accompanying drawings, in which.

SPECIFICATION

Figure 1:
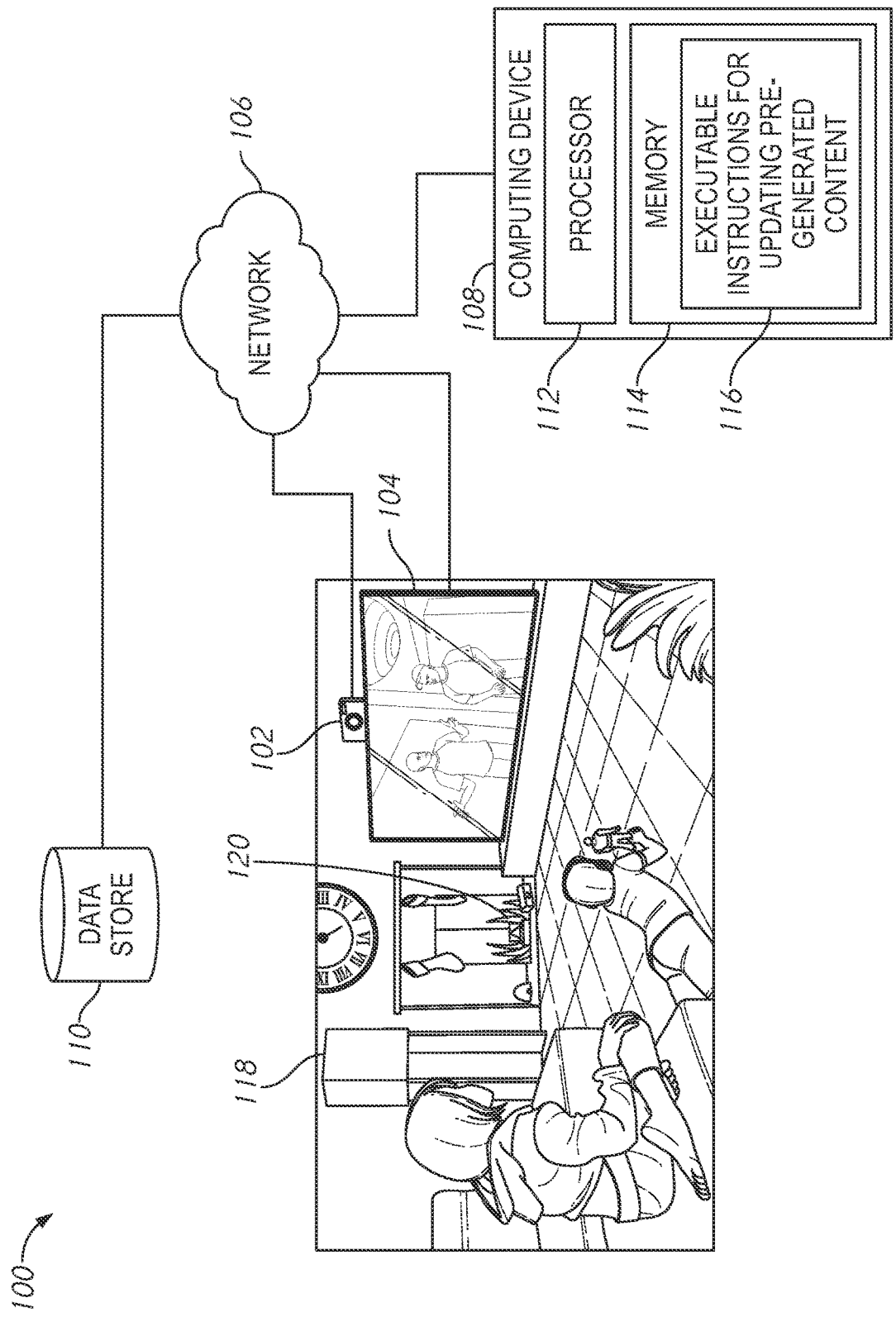
FIG. 1 is a schematic illustration of a system for updating pre-generated content based on collected environmental data, in accordance with examples described herein.

The present disclosure includes systems and methods for updating (e.g., modifying, altering, etc.) pre-generated content based on collected environmental data and/or changes in collected environmental data associated with a display environment to create a more immersive viewing experience. For example, pre-generated content displayed on a display may incorporate or otherwise respond to features or changes in a user's environment using secondary effects. For example, secondary effects applied or integrated into the pre-generated content may correspond to features in the user's environment, e.g., lighting (hue, location, brightness, etc.), user characteristics (e.g., position, size, gender, etc.), and other characteristics (e.g., location, room type, furniture positions, and the like). In this manner, aspects of the pre-generated content may be dynamically variable to be individualized for a particular viewing environment, user, and viewing instances. Such functionality may allow a user to perceive the pre-generated content as being more realistic, and the viewing experience may be different every time, even for the same pre-generated content file or pre-generated content item.

Currently content viewing options do not allow for such immersion. For example, high dynamic range (HDR) and dynamic tone mapping technologies have been used to provide an immersive viewing experience by enabling brighter content highlighting and a wider range of color detail. However, such technologies often require specialized hardware that supports HDR streaming as well as special HDR content. Further, HDR and dynamic tone mapping techniques are limited in that they cannot adapt or update the pre-generated content to a user's environment.

Other immersive viewing techniques have focused on using light emitting diode (LED) arrays to match and project on-screen colors into a viewing environment, in near real time. Here, the LED arrays actively adjust both brightness and color based upon the content displayed on-screen. However, such systems are limited to projecting only content-matched lighting, rather than reflecting or incorporating features in the user's environment onto the content being displayed.

Additional immersive viewing techniques have focused on interactive content, such as video game content, which may include some interaction with a user. Such technique, however, requires an active input from the user to elicit a change (e.g., modification, update, etc.) in the content displayed. Further, while the content can change based on user inputs, it cannot however adapt to a user's environment or changes in the user's environment. In these instances, a user cannot fully become immersed in the content or feel as though the content is engaging and realistic. Consequently, there continues to be a disconnect between a user's environment and incorporating the user's environment into content being displayed to enable an improved immersive viewing experience.

On the contrary, the techniques described herein, include modification of pre-generated content using collected environmental data corresponding to a display environment. The modification allows a user to perceive the pre-generated content as being more realistic and interactive, and enable an improved viewing experience. In some instances, the system may include one or more sensor devices (e.g., light sensor, depth sensor, or other data collection device), a processor, and a display. The sensor device(s) or sensor(s) collect environmental data, which can then be used to update select aspects of pre-generated content. For example, the system may identify (e.g., using a matching algorithm) a secondary effect corresponding to the detected and/or collected environmental data and apply the identified secondary effect to the pre-generated content before it is displayed on the display. As a specific example, the sensor device may detect a change in the brightness of a room after a lamp has been turned on. The system collects the environmental data (e.g., brightness, color, hue, tone, location, etc.) and identifies a secondary effect (e.g., a light variation filter and/or module) for the pre-generated content that corresponds to the detected and/or collected environmental data. The system then applies or integrates the identified secondary effect light variation to the pre-generated content to be displayed on the display. The secondary effect is displayed with the pre-generated content, such that the composite (e.g., displayed) content includes content corresponding to the display environment (e.g., a change in brightness).

Turning to the figures, FIG. 1 is a schematic illustration of a system 100 (e.g., pre-generated content updating system) for updating pre-generated content based on collected environmental data. It should be understood that this and other arrangements and elements (e.g., machines, interfaces, function, orders, and groupings of functions, etc.) can be used in addition to or instead of those shown, and some elements may be omitted altogether. Further, many of the elements described herein are functional entities that may be implemented as discrete or disturbed components or in conjunction with other components, and in any suitable combination and location. Various functions described herein as being performed by one or more components may be carried out by firmware, hardware, and/or software. For instance, and as described herein, various functions may be carried out by a processor executing instructions stored in memory.

The system 100 of FIG. 1 includes sensor device 102, display 104, computing device 108, and data store 110. Computing device 108 includes processor 112 and memory 114. Memory 114 includes executable instructions for updating pre-generated content 116. It should be understood that system 100 shown in FIG. 1 is an example of one suitable architecture for implementing certain aspects of the present disclosure. Additional, fewer, and/or different components may be used in other examples. It should be noted that implementations of the present disclosure are equally applicable to other types of devices such as mobile computing devices and devices accepting gesture, touch, and/or voice input. Any and all such variations, and any combination thereof, are contemplated to be within the scope of implementations of the present disclosure. Further, although illustrated as separate components of computing device 108, any number of components can be used to perform the functionality described herein. Although illustrated as being a part of computing device 108, the components can be distributed via any number of devices. For example, processor 112 may be provided via one device, sever, or cluster of servers, while memory 114 may be provided via another device, server, or cluster of servers.

As shown in FIG. 1, computing device 108, sensor device 102, and display 104 may communicate with each other via network 106, which may include, without limitation, one or more local area networks (LANs) and/or wide area networks (WANs). Such networking environments are commonplace in offices, enterprise-wide computer networks, laboratories, homes, intranets, and the Internet. Accordingly, network 106 is not further described herein. It should be understood that any number of computing devices, sensor devices, and/or displays may be employed within system 100 within the scope of implementations of the present disclosure. Each may comprise a single device or multiple devices cooperating in a distributed environment. For instance, computing device 108 could be provided by multiple server devices collectively providing the functionality of computing device 108 as described herein. Additionally, other components not shown may also be included within the network environment.

Computing device 108, sensor device 102, and display 104 have access (via network 106) to at least one data store or repository, such as data store 110, which includes data and metadata associated with at least pre-generated content, secondary filter effects, detected and/or collected environmental data, and matching algorithms, etc. In implementations of the present disclosure, data store 110 is configured to be searchable for one or more of the pre-generated content, secondary filter effects, collected environmental data, and matching algorithms. It should be understood that the information stored in data store 110 may include any information relevant to displaying and/or storing pre-generated content, collecting and/or storing environmental data, identifying secondary effects, identifying effect place holders, applying identified secondary effects, and/or displaying pre-generated content including an identified secondary effect (e.g., composite content). For example, data store 110 may include pre-generated content corresponding to a movie or a television show. In other examples, data store 110 may include collected environmental data corresponding to an action movie poster located in a display environment. In further examples, data store 110 may include secondary effects, such as light variation filters and/or color filters.

Such information stored in data store 110 may be accessible to any component of system 100. The content and volume of such information are not intended to limit the scope of aspects of the present technology in any way. Further, data store 110 may be a single, independent component (as shown) or a plurality of storage devices, for instance, a database cluster, portions of which may reside in association with computing device 108, sensor device 102, display 104, another external computing device (not shown), and/or any combination thereof. Additionally, data store 110 may include a plurality of unrelated data repositories or sources within the scope of embodiments of the present technology. Data store 110 may be updated at any time, including an increase and/or decrease in the amount and/or types of stored collected environmental data, pre-generated content, matching algorithms, secondary effects, and/or any other type of data.

Examples of pre-generated content may include but are not limited to movies, television shows, pre-recorded or live media streams, and/or any other type of visual multimedia content that may have fixed or predetermined images or video frames, i.e., contrary to dynamically rendered content, such as video games. Examples of secondary effects may include but are not limited to light variation filter effects, color filter effects, overlay filter effects, image overlays, color variation, and images or outputs that can be overlaid, integrated, or inserted into pre-generated content, such as within effect placeholders of the pre-generated content or overlaid on the pre-generated content.

The sensor device 102 described herein may generally implement the detection and/or collection of environmental data and accompanying metadata corresponding to a display environment. Sensor device 102 may include any device capable of detecting environmental data, including but not limited to, brightness data, light data, color data, contrast data, depth data, proximity data, tone data, edge data, and/or directionality data. As should be appreciated, sensor device 102 may be implemented using any number of data detection and/or collection devices, including but not limited to, light sensors, images sensors, optical devices, cameras, video recorders, or any other handheld, mobile, tablet, or wireless device capable of detecting and/or collecting at least the environmental data and accompanying metadata described herein. Generally, sensor device 102 may include software (e.g., one or more computer readable media encoded with executable instructions) and a processor that may execute the software to enable the detection and/or collection of environmental data functionality.

Examples described herein may include computing devices, such as computing device 108 of FIG. 1. Computing device 108 may in some examples be integrated with one or more sensor device(s) and/or one or more display(s) described herein. In some examples, computing device 108 may be implemented using one or more computers, servers, smart phones, smart devices, or tablets. Computing device 108 may update pre-generated content with a secondary effect based on collected environmental data. As described herein, computing device 108 includes processor 112 and memory 114. Memory 114 includes executable instructions for updating or modifying pre-generated content 116, which may be used to update pre-generated content with an identified secondary effect. In some embodiments, computing device 108 may be physically coupled to sensor device 102 and/or display 104. In other embodiments, computing device 108 may not be physically coupled to sensor device 102 and/or display 104 but collocated with the sensor device and/or the display. In even further embodiments, computing device 108 may neither be physically coupled to sensor device 102 and/or display 104 nor collocated with the sensor device and/or the display.

Computing devices, such as computing device 108 described herein may include one or more processors, such as processor 112. Any kind and/or number of processor may be present, including one or more central processing unit(s) (CPUs), graphics processing units (GPUs), other computer processors, mobile processors, digital signal processors (DSPs), microprocessors, computer chips, and/or processing units configured to execute machine-language instructions and process data, such as executable instructions for updating pre-generated content 116.

Computing devices, such as computing device 108, described herein may further include memory 114. Any type or kind of memory may be present (e.g., read only memory (ROM), random access memory (RAM), solid state drive (SSD), and secure digital card (SD card)). While a single box is depicted as memory 114, any number of memory devices may be present. Memory 114 may be in communication (e.g., electrically connected) to processor 112.

Memory 114 may store executable instructions for execution by the processor 112, such as executable instructions for updating pre-generated content 116. Processor 112, being communicatively coupled to sensor device 102 and display 104 via the execution of executable instructions for updating pre-generated content, may update the pre-generated content and display the pre-generated content, including an identified secondary effect (e.g., composite content), on display 104.

In operation, to update pre-generated content with a secondary effect or sensory effect associated with collected environmental data corresponding to a display environment, a sensor device, such as sensor device 102 detects and/or collects environmental data corresponding to a display environment. As used herein, a display environment may include any indoor or outdoor setting in which a sensor device, such as sensor device 102, may detect and/or collect environmental data. As an example, a display environment may comprise structures (e.g., walls, beams, lighting fixtures, etc.), users, animals, objects (e.g., furniture, toys, appliances, plants, etc.), conditions (e.g., change in lighting, change in position and/or orientation, etc.), and the like, from which a sensor device may detect and/or collect environmental data or a change in environmental data.

As shown in FIG. 1, environmental data may include light data, brightness data, contrast data, and the like associated with the display environment, such as data associated with lamp 118, fireplace 120, and other elements in the display environment (e.g., a room in which the display 104 is located) of FIG. 1. As should be appreciated, collected and/or detected environmental data may include additional and/or alternative data in addition to light data, brightness data, contrast data, and the like associated with environmental elements such as lamp 118 and/or fireplace 120, such as, for example, proximity data, directionality data, depth data, tone data, and edge data. Based at least in part on the detected and/or collected environmental data, processor 112 of computing device 108 may identify a secondary effect corresponding to the detected and/or collected environmental data and apply the identified secondary effect to the pre-generated content.

In one example, the applied secondary effect is a lighting filter and/or light variation filter that increases or decreases the lighting in the pre-generated content or adds a light location or highlight to the pre-generated content such that the composite content displayed on a display may mimic or reflect the lighting in the environment in which the pre-generated content is displayed. In other examples, the secondary effect may be additional or alternative effects corresponding to the detected and/or collected environmental data that may be overlaid or otherwise integrated with the pre-generated content to vary the displayed (e.g., composite) content. In some examples, the secondary effect may be pre-generated or predetermined, while in other examples, the secondary effects may be dynamically generated.

In one embodiment, to identify the secondary effect, processor 112 may transform the detected and/or collected environmental data into a plurality of vectors and compare, using a matching algorithm, the plurality of vectors to secondary effects. In some embodiments, the matching algorithm may include at least one of a brightness matching function, a light matching function, a color matching function, a contrast matching function, a depth matching function, a proximity matching function, a tone matching function, an edge matching function, or a directionality matching function. Based on a vector of the plurality of vectors exceeding a similarity threshold associated with a particular secondary effect of the plurality of secondary effects, processor 112 may identify the particular secondary effect as the secondary effect to apply to the pre-generated content. In these instances, the matching algorithm may use a best fit type of analysis to determine the secondary effect that most closely matches the environmental data. However, in other instances, other types of matching assessments may be used to select a secondary effect from the environmental data.

In some examples, processor 112 may identify a change in the detected and/or collected environmental data that meets or exceeds a threshold value, and based on the identified change, processor 112 may identify a different secondary effect that corresponds to the change in the detected and/or collected environmental data and apply the different secondary effect to the pre-generated content.

In some examples, the secondary effect is a filter and/or an overlay effect. Various filter effects and or overlays may include but are not limited to light variation filters and/or color filters. In embodiments, processor 112 applies the secondary effect to the pre-generated content prior to the pre-generated content being displayed on a display, such as display 104.

In some instances, the pre-generated content may include an effect place holder that assists in integrating the secondary effects into the pre-generated content. For example, the effect place holder is a portion of the pre-generated content that is to be filled in by secondary effects (e.g., including secondary effects that including inserting filters/effects that match or closely match the detected and/or collected environmental data into an effect place holder, as well as secondary effects that include directly inserting the detected and/or collected environmental data into an effect place holder). For example, the system may identify a secondary effect corresponding to the detected and/or collected environmental data and apply the identified secondary effect to the effect place holder before the content displayed on the display. In these instances, the pre-generated content may more readily and seamlessly adopt the secondary effects into the storyline or other artistic aspects of the content.

In another embodiment, to identify the secondary effect, processor 112 may identify an effect place holder embedded within the pre-generated content. The effect place holder may be one of any number of effect place holder types, including, for example, a light variation filter effect place holder, color filter effect place holder, an object effect place holder, a reflection effect place holder, an image effect place holder, and the like. The type of effect place holder included within the pre-generated content determines the type of secondary effect that may be inserted into the effect place holder. For example, based on a light variation filter effect place holder embedded into pre-generated content, processor 112 may insert an identified secondary effect (e.g., an identified light variation filter) matching or closely matching environmental data, detected and/or collected by sensor device 102, into the pre-generated content at the effect place holder. As another example, based on a reflection filter effect place holder embedded into pre-generated content, processor 112 may insert an identified secondary effect (e.g., the detected and/or collected environmental data associated with a piece of furniture included in the display environment), collected by sensor device 102, into the pre-generated content at the effect place holder.

Processor 112 may transform the detected and/or collected environmental data into a plurality of vectors, and compare using a matching algorithm, the plurality of vectors with the identified effect place holder. As described herein, in some examples, the matching algorithm may include at least one of a brightness matching function, a light matching function, a color matching function, a contrast matching function, a depth matching function, a proximity matching function, a tone matching function, an edge matching function, or a directionality matching function. Based on a vector of the plurality of vectors exceeding a similarity threshold associated with the effect place holder, processor 112 may identify the detected and/or collected environmental data associated with the particular vector as a secondary effect, and apply the secondary effect to the effect place holder embedded into the pre-generated content. In some examples, processor 112 may identify a change in the detected and/or collected environmental data. Based on the identified change, processor 112 may identify a different secondary effect that corresponds to the change in the detected and/or collected environmental data and apply the different secondary effect to the pre-generated content at the effect place holder prior to the pre-generated content being displayed (e.g., as composite content) at a display, such as display 104.

As a specific implementation, a sensor device may detect a poster of an action movie hanging on a wall in a display environment. The system collects the data (e.g., color data, hue data, tone data, location data, depth data, etc.) associated with the poster and identifies a secondary effect that applies the detected and/or collected environmental data to an effect place holder (e.g., a blank poster) embedded into the pre-generated content. The secondary effect is then displayed with the pre-generated content, such that the composite content displayed includes content corresponding to the user environment, e.g., a movie poster in the displayed content is similar to the detected movie poster in the environment. In this example, the secondary effect is a direct representation of collected environmental data (e.g. the data associated with the movie poster) and when overlaid at the effect place holder, mimics a portion of the environment in which the pre-generated content is displayed.

In other examples, the secondary effect may be other types of environmental data (e.g., edge data, light data, tone data, depth data, brightness data, directionality data, color data, etc.) associated with furniture and/or other objects within the display environment that may be inserted into the place holder of the pre-generated content. In some examples, the secondary effect may directly represent the environmental data collected (e.g., a picture of the movie poster), while in other examples, the secondary effect may be data similar, but not identical, to the detected and/or collected environmental data or otherwise generally corresponding to the environmental data (e.g., coloring a poster in the pre-generated content with colors that are the same as a movie poster in the display environment).

As can be appreciated, effect place holders may be located at any location within or at any time throughout the pre-generated content. Some pre-generated content may not include an effect place holder, while other pre-generated content may include one effect place holder, while further pre-generated content may include more than one effect place holder.

The display 104 described herein may generally implement display of pre-generated content and/or updated pre-generated content including an identified and applied secondary effect, as described herein. Display 104 may include any display capable of visually presenting pre-generated and updated pre-generated content. For example, display 104 may display pre-generated content, and, based on changes in environmental data collected by sensor device 102, displays updated pre-generated content including a secondary effect identified and applied by a processor, such as processor 112, based on the change in environmental data, and corresponding to the display environment.

As should be appreciated, display 104 may be implemented in any number of devices, including by not limited to, any stationarity, mobile, wireless, handheld, tablet, and remote device or otherwise capable of displaying updated pre-generated content. By way of non-limiting example, a display, such as display 104 may include a smart TV, a computer monitor, a smartphone, a tablet, and the like. As should further be appreciated, display 104 may utilize any number of technologies to implement display of pre-generated content and/or updated pre-generated content including an identified and applied secondary effect, such as, for example, electroluminescent display (ELD), liquid crystal display (LCD), light-emitting diode (LED) backlit LCD, thin-film transistor (TFT) LCD, organic LED (OLED), active-matrix OLED (AMOLED), plasma display (PDP), quantum dot LED display (QLED), and the like. Generally, display 104 may include software (e.g., one or more computer readable media encoded with executable instructions) and a processor that may execute the software to provide display (e.g., presentation of) updated pre-generated content.

Figure 2A:
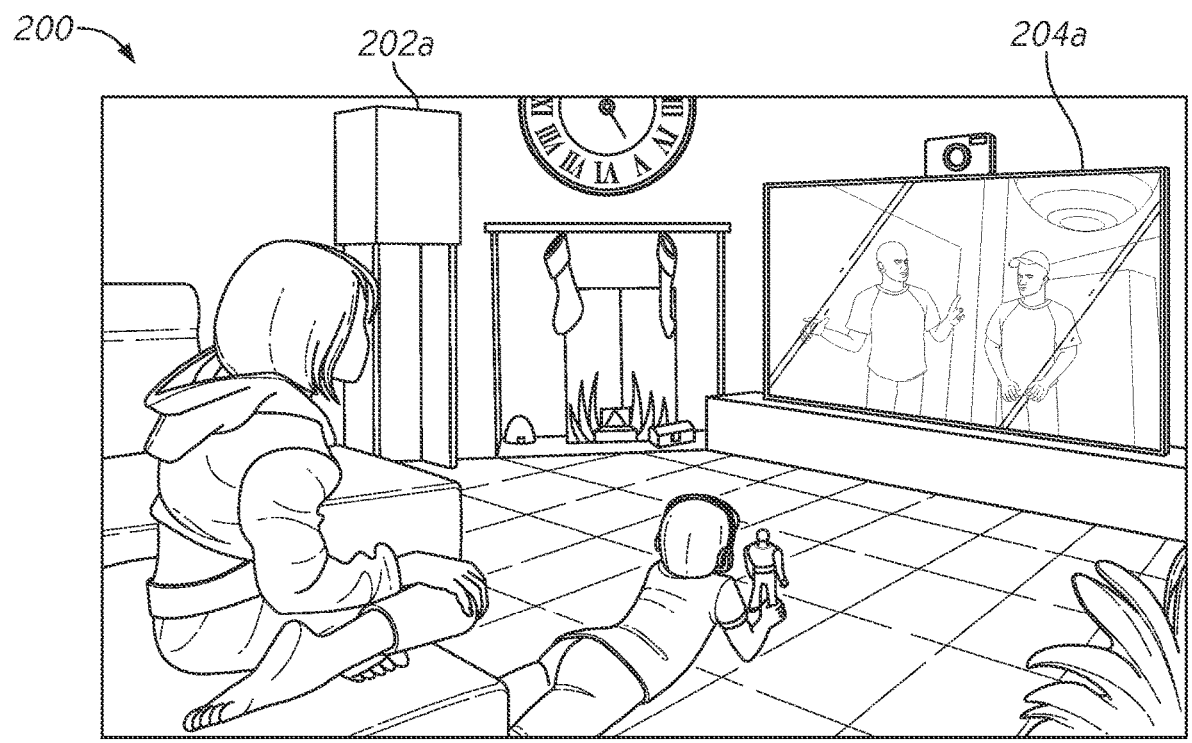
FIGS. 2A and 2B illustrate partial scenes of an example of updating pre-generated content based on collected environmental data, in accordance with examples described herein.
Figure 2B:
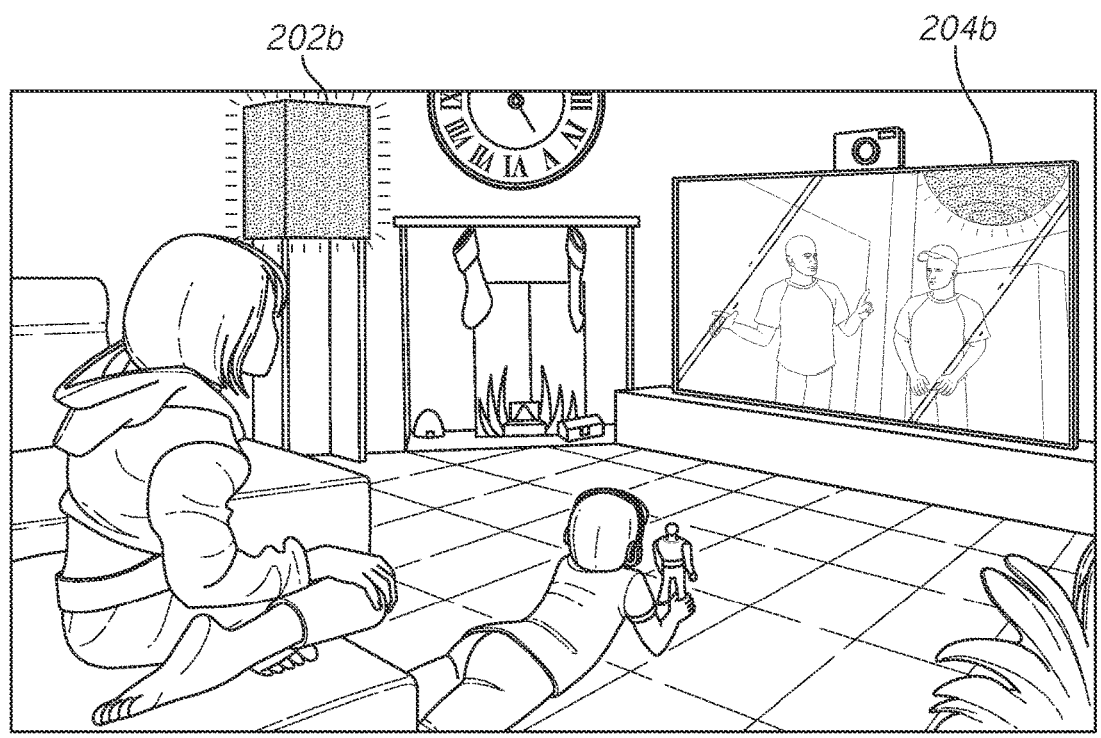

Now turning to FIGS. 2A and 2B, FIGS. 2A and 2B are partial scenes of an example of updating pre-generated content based on detected and/or collected environmental data, in accordance with examples described herein. FIG. 2A includes lamp 202a in the display environment and chandelier 204a displayed as pre-generated content on the display (not marked). As shown, lamp 202a is turned off, and chandelier 204a does not reflect identified environmental data. In contrast, FIG. 2B, includes lamp 202b (which is the same lamp as lamp 202a of FIG. 2A but at a different illumination level) in the display environment and chandelier 204b (which is the same chandelier as chandelier 204a of FIG. 2A but at a different illumination level) displayed as updated pre-generated content on the display (not marked). As shown, lamp 202b is turned on (e.g., a change in environmental data).

Using systems and methods described herein, chandelier 204b displayed as updated pre-generated content on a display (such as display 104 of FIG. 1) reflects the environmental change that occurred (e.g., change in light data, brightness data, contrast data, etc.) from the light emitting from lamp 202b. More particularly, based on the lamp 202b emitting light data, a sensor (such as sensor device 102 of FIG. 1) detected and/or collected the change in environmental data, a processor (such as processor 112 of FIG. 1) identified a secondary effect identical to, similar to, or otherwise corresponding to the detected and/or collected environmental data, and applied the identified secondary effect to the pre-generated content in near real time. The display (such as display 104 of FIG. 1) then displayed the pre-generated content including the secondary effect (e.g., displays a well-lit chandelier 204b).

As should be appreciated, FIGS. 2A and 2B are just one example of updating pre-generated content based on detected and/or collected environmental data (e.g., a lamp being turned on, and as a result, updating the chandelier in the pre-generated content displayed on the display) in the display environment. However, in other examples, the pre-generated content may be additionally or alternatively updated based on other detected and/or collected environmental data in the display environment. As one example, the pre-generated content may be updated based on the use of a toy (not marked) in FIGS. 2A and 2B. As another example, the pre-generated content may be updated based on a change in the brightness of the fireplace (not marked) in FIGS. 2A and 2B. As yet another example, the pre-generated content may simultaneously be updated based on detected and/or collected environmental data associated with the lamp being turned on, the toy being used, and the brightness of the fireplace in the display environment.

In some examples, the pre-generated content may include more than one element that can be updated, such as more than one light source (e.g., an overhead light such as chandelier 204a of FIG. 2A, as well as additional light sources, such as floor lamps, flashlights, and the like). In these cases, the system may identify where to apply (e.g., to which light source) an identified secondary effect (e.g., a light variation filter) on the pre-generated content.

In one example, the system may determine where to apply the identified secondary effect based at least in part on a location-based best-fit analysis. In such an example, the pre-generated content may include a floor lamp at the lower left corner of the display, and a chandelier in the upper right corner of the display. Here, if a light source positioned in the left side of the display environment turns on (e.g., increases or otherwise changes in illumination value), the system may identify a secondary effect based on detected and/or collected environmental data associated with the lamp turning on. Based on at least a location-based best-fit analysis, the system may further determine and apply the identified secondary effect to the floor lamp in the pre-generated content that is located at the lower left corner of the display. Here, the system determined where to apply the identified secondary effect based at least in part on the location of the light source that turned on in the display environment.

In another example, the system may determine where to apply the identified secondary effect based at least in part on a type-based best-fit analysis. Similar to the above example, in this example the pre-generated content may include a floor lamp at the lower left corner of the display, and a chandelier in the upper right corner of the display. Here, if a light source (e.g., an overhead light) in the display environment turns on (e.g., increases or otherwise changes in illumination value), the system may identify a secondary effect based on detected and/or collected environmental data associated with the overhead light turning on. Based on at least a type-based best-fit analysis the system may further determine and apply the identified secondary effect to the chandelier (e.g., an overhead light) in the pre-generated content in the display. Here, the system determined where to apply the identified secondary effect based at least in part on the type of light source that turned on in the display environment.

In yet another example, the system may determine where to apply the identified secondary effect based at least in part on an effect place holder (described herein) in the pre-generated content. Similar to the above example, in this example the pre-generated content may include a floor lamp at the lower left corner of the display, and a chandelier in the upper right corner of the display. Here, if a light source (e.g., an overhead light) in the display environment turns on (e.g., increases or otherwise changes in illumination value), the system may identify a secondary effect (e.g., a light variation filter) based on detected and/or collected environmental data associated with the overhead light turning on. They system may further identify an effect place holder within the pre-generated content associated with the floor lamp in the lower left corner of the display. Based on at least in part on the effect place holder, the system may further determine and apply the identified secondary effect to the floor lamp in the pre-generated content in the display. Here, the system determined where to apply the identified secondary effect based at least in part on the identified effect place holder in the pre-generated content.

As should be appreciated, while only a location-based best-fit analysis, a type-based best-fit analysis technique, and an effect place holder technique are described for determining where to apply an identified secondary affect in pre-generated content with, for example, multiple light sources, other techniques not described herein for determining where to apply a secondary effect are contemplated to be within the scope of implementations of the present disclosure. These techniques may also be applied in additional examples where the pre-generated content and/or the display environment includes, for example, more than one poster, more than one user, more than one animal, more than one object, and more than one condition, etc. As should further be appreciated, in the above examples, the system applies the identified secondary effect to the determined appropriate location in the pre-generated content before displaying the updated pre-generated content on a display.

Figure 3:
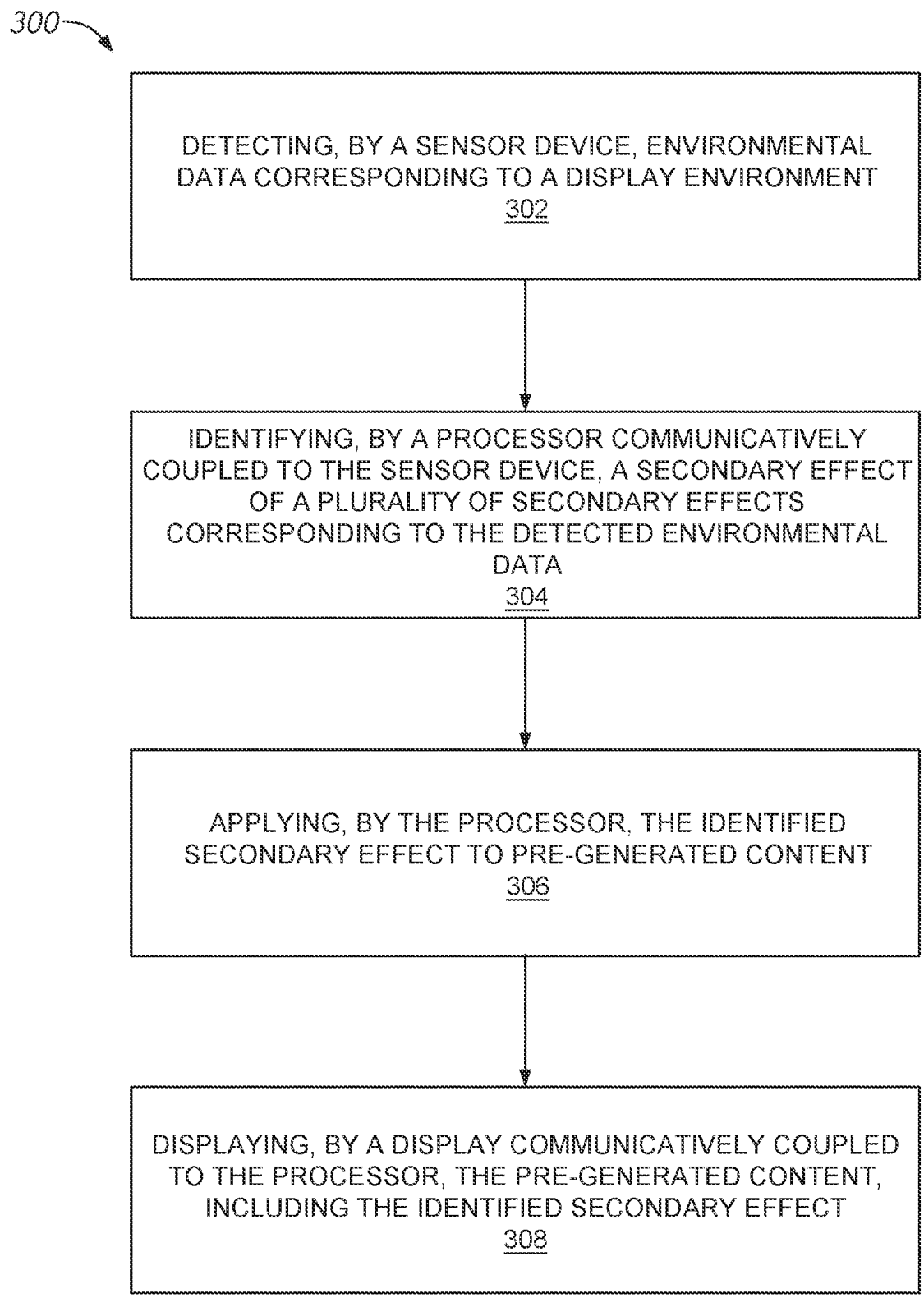
FIG. 3 is a flowchart of a method for updating pre-generated content based on collected environmental data, in accordance with examples described herein.

FIG. 3 is a flowchart of a method for updating pre-generated content based on detected and/or collected environmental data arranged in accordance with examples described herein. The method 300 may be implemented, for example, using the system 100 of FIG. 1.

The method 300 includes detecting and/or collecting, by a sensor device, environmental data in step 302; identifying, by a processor communicatively coupled to the sensor device, a secondary effect corresponding to the detected and/or collected environmental data in step 304; applying, by the processor, the identified secondary effect to pre-generated content in step 306; and displaying, by a display communicatively coupled to the processor, the pre-generated content, including the identified secondary effect in step 308.

Step 302 includes detecting and/or collecting, by a sensor device, environmental data. In one embodiment, a sensor device, such as sensor device 102 of FIG. 1 may include any device capable of capturing at least environmental data, including but not limited to, brightness data, light data, color data, contrast data, depth data, proximity data, tone data, edge data, and/or directionality data, as well as any accompanying metadata.

Step 304 includes identifying, by a processor communicatively coupled to the sensor device, a secondary effect corresponding to the detected and/or collected environmental data. In some embodiments, identifying a secondary effect may include transforming collected environmental data into a plurality of vectors and comparing, using a matching algorithm, the plurality of vectors to secondary effects. Based on a vector of the plurality of vectors exceeding a similarity threshold associated with a particular secondary effect of the plurality of secondary effects, a particular secondary effect may be identified as the secondary effect to apply to the pre-generated content.

As one example, the sensor device 102 may detect a change in the brightness of a room after a lamp has been turned on. The system collects the environmental data (e.g., brightness data, color data, etc.) associated with the change in brightness. To identify an appropriate secondary effect to apply to the pre-generated content, the processor transforms the detected and/or collected brightness data into a brightness vector with a particular vector length. The processor compares, using a matching algorithm, the vector length of the detected and/or collected brightness data to the brightness vector lengths of various secondary effects. The processor identifies the secondary effect with a brightness vector length that most closely matches the vector length of the vector corresponding to the detected and/or collected brightness data (e.g., exceeds a similarity threshold), as the appropriate secondary effect to apply to the pre-generated content.

As another example, the sensor device 102 may detect the colors of the walls associated with the display environment. Here, the system collects the environmental data (e.g., hue data, etc.) associated with the color of the walls. To identify an appropriate secondary effect to apply to the pre-generated content (e.g. to update the walls within the pre-generated content to match or closely match the walls of the display environment), the processor runs a color analysis on the detected and/or collected environmental data to determine the color of the walls and transforms that color into a corresponding color vector. The processer compares, using a matching algorithm, the color vector length of the detected and/or collected color data to the color vector lengths of various secondary effects. The processor identifies the secondary effect with a color vector length that most closely matches the color vector length of collected color data (e.g., exceeds a similarity threshold), as the appropriate secondary effect to apply to the pre-generated content.

While only a single brightness and color matching technique are described, it should be appreciated that other matching techniques for brightness and color are contemplated to be within the scope of implementations of the present disclosure. Further, while only a single matching technique is described in each of the above examples, it should be appreciated that matching techniques are not mutually exclusive. As such, some examples, more than one secondary effect (e.g., a brightness secondary effect and a color secondary effect) may be simultaneously identified, and more than one identified secondary effect may be applied to the pre-generated content at the same time. Even further, while only a matching techniques for brightness and color matching are described, it should be appreciated that matching techniques associated with other types of collected environmental data, such as edge data, tone data, directionality data, depth data, and the like, are contemplated to be within the scope of implementations of the present disclosure.

As should be understood, in some embodiments, no secondary effects may be identified and/or applied. In other embodiments, one secondary effect may be identified and/or applied. In even further embodiments, more than one secondary effect may be identified and/or applied. In some embodiments, more than one secondary effect may be identified by only or (or none) are applied.

Step 306 includes applying, by the processor, the identified secondary effect to pre-generated content. In embodiments, the identified secondary effect may be applied to the pre-generated content before being displayed on a display. For example, secondary effects applied to, or integrated into, the pre-generated content may correspond to features in the user's environment, e.g., lighting (hue, location, brightness, etc.), user characteristics (e.g., position, size, gender, etc.), and other characteristics (e.g., location, room type, furniture position, orientation, and/or size, other object position, orientation, and/or size, and the like).

In one specific implementation, the secondary effect may be applied as a filter over the pre-generated content, such as a light variation filter or a color filter. In another specific implementation, the secondary effect may be applied as an overlay over the pre-generated content, such as an object overlay to include an object in the pre-generated content that was not previously included. In an even further specific implementation, the secondary effect may be applied as an overlay over the pre-generated content, such as a color overlay to color in an object within the pre-generated content. In an additional specific implementation, the secondary effect may be applied as an identified secondary effect inserted at an effect place holder integrated into the pre-generated content. In yet another specific implementation, the secondary effect may be applied as the actual collected environmental data inserted into an effect place holder embedded into the pre-generated content.

Step 308 includes displaying, by a display communicatively coupled to the processor, the pre-generated content, including the identified secondary effect.

Figure 4:
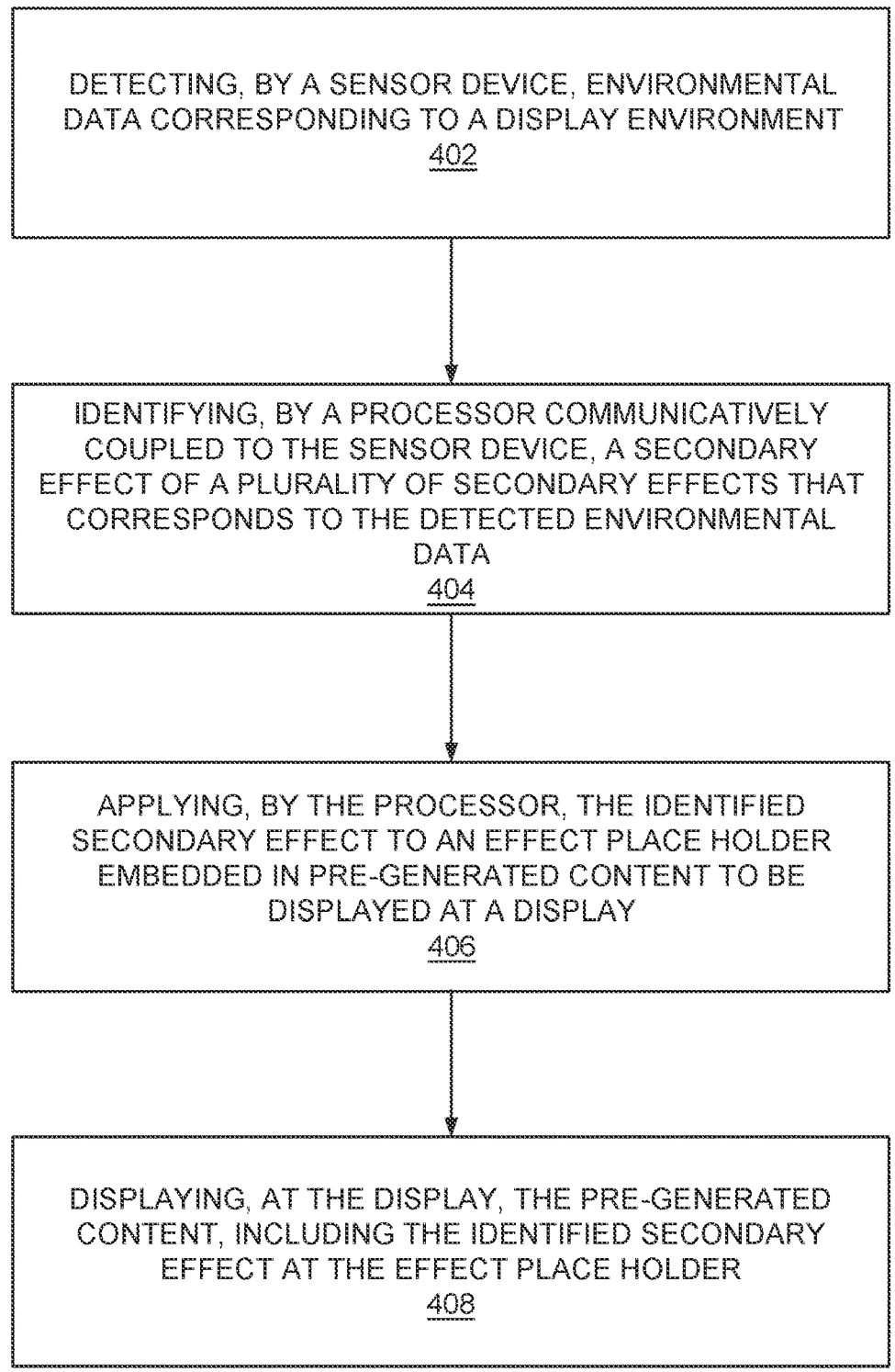
FIG. 4 is a flowchart of a method for updating pre-generated content based on collected environmental data, in accordance with examples described herein.

FIG. 4 is a flowchart of a method for updating pre-generated content based on detected and/or collected environmental data arranged in accordance with examples described herein. The method 400 may be implemented, for example, using the system 100 of FIG. 1.

The method 400 includes detecting and/or collecting, by a sensor device, environmental data in step 402; identifying, by a processor communicatively coupled to the sensor device, a secondary effect that corresponds to the detected and/or collected environmental data in step 404; applying, by the processor, the identified secondary effect to an effect place holder embedded in pre-generated content to be displayed at a display in step 406; and displaying, at the display, the pre-generated content, including the identified secondary effect at the effect place holder in step 408.

Step 402 includes detecting and/or collecting, by a sensor device, environmental data. As described herein, in one embodiment, a sensor device, such as sensor device 102 of FIG. 1 may include any device capable of capturing at least environmental data, including but not limited to, brightness data, light data, color data, contrast data, depth data, proximity data, tone data, edge data, and/or directionality data, as well as any accompanying metadata.

Step 404 recites identifying, by a processor communicatively coupled to the sensor device, a secondary effect that corresponds to the detected and/or collected environmental data. In some embodiments, identifying a secondary effect may include identifying the type of effect place holder embedded within the pre-generated content. In some examples, the type of effect place holder determines the type of secondary effect that may be inserted into the effect place holder. For example, based on a light variation filter effect place holder embedded into pre-generated content, processor 112 may insert an identified secondary effect (e.g., an identified light variation filter) matching or closely matching collected environmental data, collected by sensor device 102, into the pre-generated content at the effect place holder.

The detected and/or collected environmental data may be transformed into a plurality of vectors, and compared, using a matching algorithm, with the identified effect place holder. As described herein, based on a vector of the plurality of vectors exceeding a similarity threshold associated with the effect place holder, a processor, such as processor 112 of FIG. 1 may identify the detected and/or collected environmental data associated with the particular vector as a secondary effect, and apply (e.g., insert, integrate, embed) the secondary effect to the pre-generated content at the effect place holder.

Step 406 includes applying, by the processor, the identified secondary effect to an effect place holder embedded in pre-generated content to be displayed at a display. In embodiments, the identified secondary effect may be applied to the pre-generated content at the effect place holder before being displayed on a display.

Step 408 includes displaying, at the display, the pre-generated content, including the identified secondary effect (e.g., the composite content) at the effect place holder.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A system comprising:
   a sensor configured to detect environmental data corresponding to a change in an object in a display environment;
   a processor, communicatively coupled to the sensor, and configured to, based at least on the detected environmental data, identify a secondary effect of a plurality of secondary effects that most closely matches the detected environmental data to apply to pre-generated content; and
   a display, communicatively coupled to the processor, and configured to display the pre-generated content, including the identified secondary effect, wherein:
      the pre-generated content includes a content object including an effect place holder, and
      the secondary effect is rendered in the effect place holder and is representative of the change.

2. The system of claim 1, wherein the detected environmental data includes at least one of brightness data, light data, color data, contrast data, depth data, proximity data, tone data, edge data, or directionality data.

3. The system of claim 1, wherein the processor is further configured to:
   identify a change in the detected environmental data;
   based on the identified change, identify a different secondary effect of the plurality of secondary effects that most closely corresponds to the identified change; and
   apply the different secondary effect corresponding to the identified change to the pre-generated content.

4. The system of claim 1, wherein the secondary effect is a light variation filter.

5. The system of claim 1, wherein the secondary effect is a color filter.

6. The system of claim 1, wherein the processor is further configured to apply the secondary effect to the pre-generated content prior to the pre-generated content being displayed on the display.

7. A system comprising,
   a sensor configured to detect environmental data corresponding to a display environment;
   a processor, communicatively coupled to the sensor, and configured to, based at least on the detected environmental data, identify a secondary effect of a plurality of secondary effects corresponding to the detected environmental data to apply to pre-generated content, wherein identifying the second effect comprises:
      transforming the detected environmental data into a plurality of vectors;
      comparing, using a matching algorithm, the plurality of vectors to the plurality of secondary effects; and
      based on a vector of the plurality of vectors exceeding a similarity threshold associated with a particular secondary effect of the plurality of secondary effects, identifying the particular secondary effect as the secondary effect to apply to the pre-generated content; and
   a display, communicatively coupled to the processor, and configured to display the pre-generated content, including the identified secondary effect.

8. The system of claim 7, wherein the matching algorithm includes at least one of a brightness matching function, a light matching function, a color matching function, a contrast matching function, a depth matching function, a proximity matching function, a tone matching function, an edge matching function, or a directionality matching function.

9. A system comprising,
   a sensor configured to detect environmental data corresponding to a display environment;
   a processor, communicatively coupled to the sensor, and configured to, based at least on the detected environmental data, identify a secondary effect of a plurality of secondary effects corresponding to the detected environmental data to apply to pre-generated content, wherein identifying the secondary effect comprises:
      identifying an effect place holder embedded in the pre-generated content;
      transforming the detected environmental data into a plurality of vectors;
      comparing, using a matching algorithm, the plurality of vectors with the effect place holder; and
      based on a particular vector of the plurality of vectors exceeding a similarity threshold associated with the effect place holder, identifying the detected environmental data associated with the particular vector as the secondary effect to apply to the pre-generated content at the effect place holder; and
   a display, communicatively coupled to the processor, and configured to display the pre-generated content, including the identified secondary effect.

10. The system of claim 9, wherein the matching algorithm includes at least one of a brightness matching function, a light matching function, a color matching function, a contrast matching function, a depth matching function, a proximity matching function, a tone matching function, an edge matching function, or a directionality matching function.

11. A method comprising:
    detecting, by a sensor, environmental data corresponding to a change in an object in a display environment;

identifying, by a processor communicatively coupled to the sensor, a secondary effect of a plurality of secondary effects that most closely matches the detected environmental data;

applying, by the processor, the identified secondary effect to an effect place holder included in a content object in the pre-generated content; and displaying, by a display communicatively coupled to the processor, the pre-generated content, including the identified secondary effect, wherein the secondary effect is representative of the change.

12. The method of claim 11, wherein the detected environmental data includes at least one of brightness data, light data, color data, contrast data, depth data, proximity data, tone data, edge data, or directionality data.

13. The method of claim 11, wherein identifying the secondary effect comprises:

transforming the detected environmental data into a plurality of vectors;

comparing, using a matching algorithm, the plurality of vectors to the plurality of secondary effects; and based on a vector of the plurality of vectors exceeding a similarity threshold associated with a particular secondary effect of the plurality of secondary effects, identifying the particular secondary effect as the secondary effect to apply to the pre-generated content.

14. The method of claim 13, wherein the matching algorithm includes at least one of a brightness matching function, a light matching function, a color matching function, a contrast matching function, a depth matching function, a proximity matching function, a tone matching function, an edge matching function, or a directionality matching function.

15. The method of claim 11, further comprising:

identifying, by the processor, a change in the detected environmental data;

based on the identified change, identifying, by the processor, a different secondary effect of the plurality of secondary effects that most closely corresponds to the identified change; and applying, by the processor, the different secondary effect corresponding to the identified change to the pre-generated content.

16. The method of claim 11, wherein the secondary effect is a light variation filter or a color filter.

17. The method of claim 11, wherein the secondary effect is a pre-generated effect, and wherein the pre-generated effect is an overlay.

18. The method of claim 11, wherein the secondary effect is applied, by the processor, to the pre-generated content prior to the pre-generated content being displayed on the display.

19. A method comprising:

detecting, by a sensor, environmental data corresponding to a change in an object in a display environment;

identifying, by a processor communicatively coupled to the sensor, a secondary effect of a plurality of secondary effects that corresponds to the detected environmental data;

applying, by the processor, the identified secondary effect to a content object in the pre-generated content that includes an effect place holder; and displaying, at the display, the pre-generated content, including the identified secondary effect at the effect place holder, wherein the secondary effect is representative of the change.

20. The method of claim 19, wherein the environmental data includes at least one of brightness data, light data, color data, contrast data, depth data, proximity data, tone data, edge data, or directionality data.

21. The method of claim 19, wherein identifying the secondary effect comprises:

identifying the effect place holder embedded in the pre-generated content;

transforming the detected environmental data into a plurality of vectors;

comparing, using a matching algorithm, the plurality of vectors with the effect place holder; and based on a particular vector of the plurality of vectors exceeding a similarity threshold associated with the effect place holder, identifying the detected environmental data associated with the particular vector as the secondary effect to apply to the pre-generated content at the effect place holder.

22. The method of claim 19, wherein the secondary effect is applied, by the processor, to the pre-generated content at the effect place holder prior to the pre-generated content being displayed on the display.

* * * * *